2,956,231
SUPPRESSION OF SECONDARY OVERSWINGS OR OVERLAPS IN MULTISTAGE AMPLIFIERS OF WIDE DYNAMIC RANGE

Jaroslav Obraz, Prague, Czechoslovakia, assignor of one-half to Chirana Praha, narodni podnik, Prague, Czechoslovakia, a corporation of Czechoslovakia Filed Oct. 28, 1957, Ser. No. 692,969

Claims priority, application Czechoslovakia Oct. 26, 1956

7 Claims. (Cl. 328—32)

This invention relates to amplifiers of wide dynamic range, for example, of the kind used in ultrasonic pulse-reflex devices for the non-destructive testing of materials which require amplification of pulse sequences.

In ultrasonic pulse-reflex devices for the non-destructive testing of materials, some of the pulses in the sequence to be amplified may have peak voltages which are greater, by several orders of magnitude, than the peak voltages of the following pulses in the sequence, and multistage amplification is required for detection of such following pulses of relatively small magnitude. However, when the pulses having relatively great peak voltages are limited and rectified in the first stage of a multistage amplifier and passed through a conventional resistor-condenser coupling, hereinafter referred to as an RC coupling, between the first and second stages of the amplifier, an "overlap" or "overswing" is generated, that is, a voltage of polarity opposed to that of the voltage of the limited and rectified pulses and which follows the latter in point of time, and is hereinafter referred to as the "primary overswing." After passage through two amplifier stages and the following RC couplings, the overlap or overswing then has an initial or primary overswing of polarity opposed to that of the limited and rectified pulses and a secondary overswing which follows the primary overswing and has the same polarity as the limited and rectified pulses. Such secondary overswings or overlaps cause faulty signal representation and, of even greater importance in connection with the amplification of the pulse sequences in ultrasonic pulse-reflex devices for the non-destructive testing of materials, they prevent detection of the pulses of relatively minute magnitude following the pulses having relatively great peak voltages that generate the overlaps or overswings.

Accordingly, it is an object of the present invention to provide multistage amplifiers, particularly for use in ultrasonic pulse-reflex devices for the non-destructive testing of materials, and that embody means for suppressing the secondary overswings so that a pulse sequence having initial pulses of relatively great magnitude and following, relatively minute pulse can be accurately amplified and detected.

In accordance with an aspect of this invention, a diode is provided to short the primary overswings at the input end of the coupling for the second or any later stage of a multistage amplifier, while that coupling is given a time constant which is smaller, by at least one order of magnitude, than the coupling of a preceding stage.

The above, and other objects, features and advantages of the invention, will be apparent in the following detailed description which is to be read in connection with the accompanying drawings, forming a part hereof, and wherein:

Fig. 1a is a diagram representing a typical pulse sequence of the kind obtained with an ultrasonic pulse-reflex device for the non-destructive testing of materials;

Fig. 1b is a diagram representing the output signal from the first limiting and rectifying stage of a multistage amplifier receiving the pulse sequence of Fig. 1a;

Fig. 1c is a diagram illustrating a portion of the signal of Fig. 1b following the passage thereof through the RC coupling between the first and second stages of a multistage amplifier;

Fig. 1d is a diagram representing the overswing following passage through two stages of a multistage amplifier;

Fig. 1e is a diagram similar to that of Fig. 1d, but representing the overswings following passage through a three stage amplifier;

Fig. 1f is a diagram similar to that of Fig. 1e, but showing the effect of connecting a diode in parallel with the coupling following the second stage of a multistage amplifier as suggested heretofore;

Figure 1:
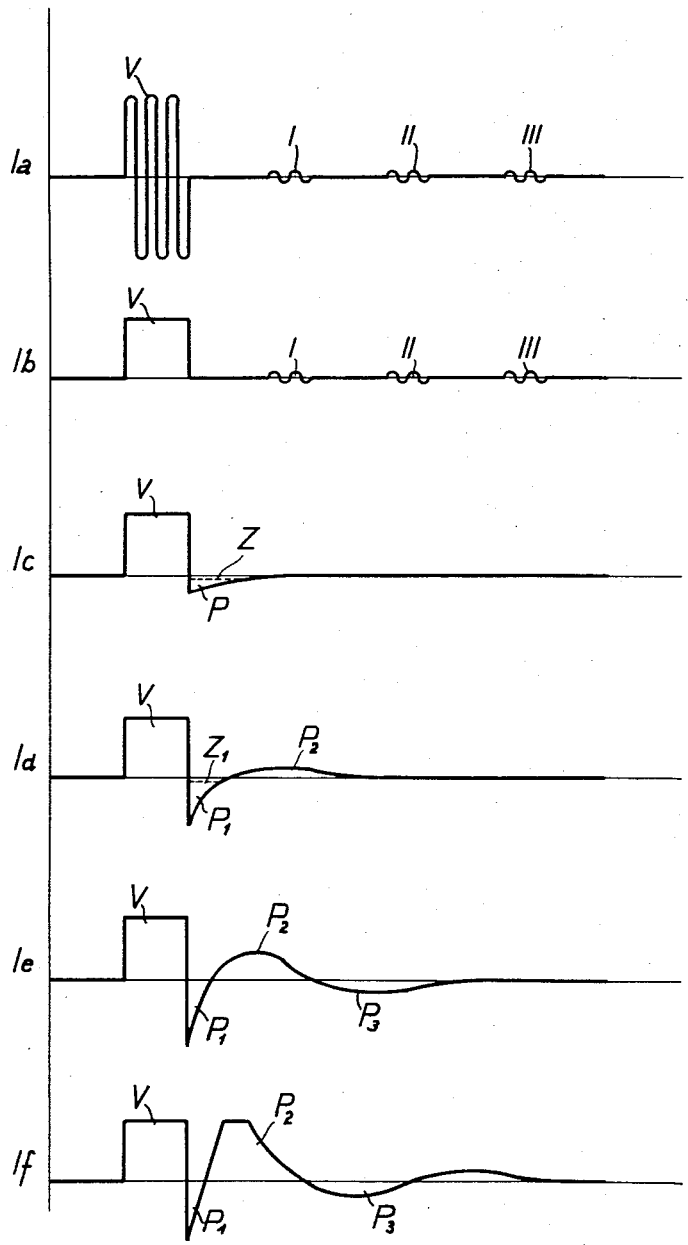

Referring to the drawings in detail, and initially to Fig. 1a thereof, it will be seen that the signals obtained from a conventional ultrasonic pulse-reflex device for the non-destructive testing of materials include pulses V, for example, as transmitted by an electro-acoustic transducer, and pulses I, II and III which follow the pulses V in point of time and which are signals obtained from the reflections of the pulses V by the material undergoing test. The signals or pulses V usually have a magnitude of $10^2$ to $10^3$ $V_{ss}$, whereas the immediately following reflected signals I, II and III only have a magnitude of from $10^{-4}$ to $10^{-2}$ $V_{ss}$. In the foregoing, the symbol $V_{ss}$ indicates the voltage from peak to peak which, in a signal having values both above and below zero, that is, positive and negative half-waves, is the sum of the maximum positive signal voltage and the maximum negative signal voltage, as is customary in this art. Thus, the signals V are greater, by at least four orders of magnitude, than the signals I, II and III, so that the latter signals can be detected only by multistage amplification thereof.

In the course of such multistage amplification, the signals V are limited and rectified in the first amplifier stage, so that the output from the first stage is represented by a rectangular enveloping curve including the entire group of oscillations V as is shown in Fig. 1b. After passing through the usual RC coupling between the first and second stages of the amplifier, an overswing or overlap P is generated which has a polarity opposite to that of the limited and rectified signal V (Fig. 1c) and which is therefore referred to as the primary overswing. In Fig. 1c, the signals I, II and III have been omitted for the sake of simplicity.

After passage through two stages of amplification and the RC couplings following such stages, the overswing illustrated in Fig. 1d is generated and includes an initial section $P_1$ having a polarity opposed to that of the signal V and a following portion or section $P_2$ which is of the same polarity as the signal V and is referred to as the secondary overswing.

Thus, in two stage amplifiers, the overswing or overlap reaches a value of zero at infinity and passes only once through zero between the sections $P_1$ and $P_2$ of the overswing. On the other hand, in a three stage amplifier, as illustrated in Fig. 1e, the overswing includes an initial portion $P_1$ and a final portion $P_3$ having polarities opposed to that of the initial signal V and an intermediate or secondary overswing $P_2$ having a polarity the same as that of the signal V.

It will be apparent that the next amplifier stage will be blocked during the period of the negative or primary overswing $P_1$ so that signals of smaller amplitude, for example, the pulses I, II and III, cannot be amplified during this period unless means are employed to suppress such overswings.

Figure 2:
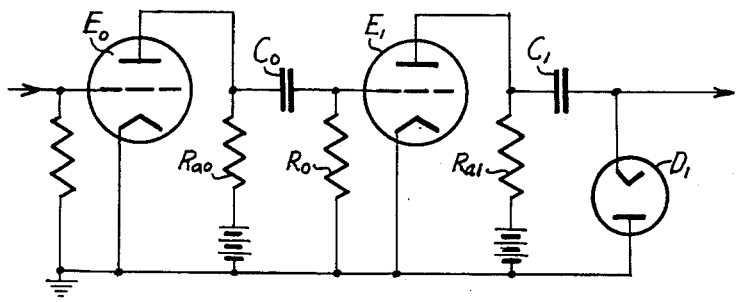
Fig. 2 is a wiring diagram illustrating the use of a diode connected in parallel with the coupling following the second stage of a multistage amplifier, in accordance with the prior art.

Several methods for suppressing the above described overswings have been suggested. For example, as illustrated in Fig. 2, it has been proposed that a diode $D_1$ be connected in parallel with the RC coupling between successive stages of a multistage amplifier to replace the leakage resistor of the subsequent stage of amplification, thereby to suppress the overswings generated in the coupling with which it is connected in parallel. It will be noted that, in Fig. 2, the diode $D_1$ is connected in parallel with the coupling following the second stage of the amplifier. In fact, the use of a diode in such a circuit in the initial stages of an amplifier, for example, in the RC coupling following the first stage $E_0$, is not recommended, as the amplitude of the overswing is still very small at such initial stage and the resistance of the diode is reduced to practically small values only at sufficiently great signal amplitudes because of the non-linear characteristics of the diode. Thus, the known circuit arrangement illustrated in Fig. 2 can be effective only if it is employed after the second stage $E_1$ of amplification, or at some later stage of the amplifier, where the amplitude of the negative portion of the overswing, that is, the primary overswing $P_1$, is sufficiently great.

However, if overswings are generated in the preceding coupling, that is, in the coupling $R_0C_0$ following the initial stage $E_0$, then the diode $D_1$ cannot be used in the indicated circuit because the condenser $C_1$ of the coupling following the second stage of amplification is charged to a high voltage during the overswing. This results from the fact that the diode $D_1$ is connected in such a way that it will conduct current only during an overswing having a polarity opposed to that of the signal V. The charged condenser $C_1$ is discharged by a current having a reversed polarity which generates a strong secondary overswing $P_2$. This strong secondary overswing $P_2$ can no longer be removed in the subsequent amplifier stages and, on the contrary, are further amplified in such subsequent stages to produce a signal as indicated in Figs. 1e and 1f.

The secondary overswings described above cause faulty signal representation and, of even greater importance in connection with the amplification of the pulse sequence from an ultrasonic pulse-reflex device for testing materials, such secondary overswings prevent detection of the weak signals, such as, the reflex signals I, II and III which appear immediately after the signal V (Figs. 1a and 1b). This difficulty makes it practically impossible to detect defects close to the surface of a test object employing conventional ultrasonic pulse-reflex devices, or to measure the thickness of light gauge walls using ultrasonic thickness gauges.

In accordance with the present invention, the above described difficulties resulting from the secondary overswings are eliminated by providing a diode which shorts the primary overswing at the input end of the coupling of the second or any later amplification stage of a multistage amplifier, while such coupling of the second or later amplification stage has a time constant which is smaller than the time constant of the preceding coupling by at least one order of magnitude. It is possible by suitably selecting the time constants of the individual couplings and by connecting a diode to the input side of the coupling in which only a primary overswing or overlap is generated, to practically suppress the harmful secondary overswing at the output side of the related coupling, so that a multistage amplifier embodying this invention is free of the aforementioned disadvantaegs to improve the resolving power of an ultrasonic pulse-reflex device so that it can detect defects in the material near the surface of the object undergoing test and so that small wall thicknesses, for example, of 3.5 mm. or more, can be measured with ultrasonic thickness gauges.

Figure 3:
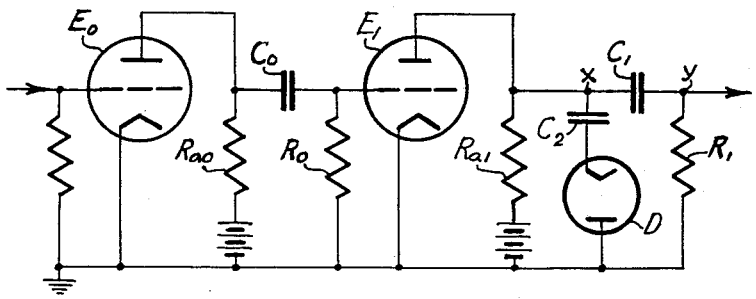
Fig. 3 is a wiring diagram illustrating an embodiment of the present invention.

Referring now to Fig. 3, it will be seen that two stages of a multistage amplifier are there illustrated with the first amplifier stage $E_0$ and the second amplifier stage $E_1$ being coupled by a resistor $R_0$ and a condenser $C_0$ forming a RC coupling. Further, Fig. 3 illustrates a second coupling consisting of a condenser $C^1$ and a resistor $R_1$ and, in accordance with the present invention, the input of the second coupling is connected to a device consisting of a blocking condenser $C_2$ and a diode D. It will be apparent that the diode D shorts the overswings at the point $x$, that is, at the input of the coupling consisting of the resistor $R_1$ and the condenser $C_1$, so that no secondary overswings can be generated at the point $y$, that is, at the output of the second coupling. The capacity of the condenser $C_2$ may be selected according to the duration of the overswing and without regard to the capacity of the condenser $C_1$. On the other hand, the capacity of condenser $C_1$ is limited, as mentioned above, so that the time constant of the coupling $C_1R_1$ will be less than the time constant of the preceding coupling $C_0R_0$ by at least one order of magnitude.

Figure 3A:
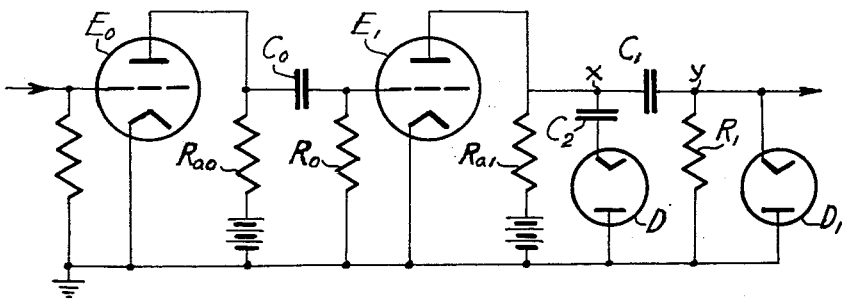
Fig. 3a is a wiring diagram showing a modification of the Fig. 3 embodiment of the invention.

Since the magnitude of the plate resistor $R_{a1}$ is always negligibly small in a pulse amplifier as compared to the magnitude of the back resistance of diode D, the peak voltage of the secondary overswing produced by the blocking condenser $C_2$ and the diode D at point $x$ is negligible as compared to the magnitude of the signal voltage. Following the suppression of the overswing at the input $x$ of the coupling $R_1C_1$, only a primary overswing occurs at the output $y$ and this can be eliminated without generating a secondary overswing, for example, by connecting a diode $D_1$ in parallel with the resistor $R_1$. This latter modification is shown in Fig. 3a of the drawings.

It is sometimes preferable to reduce the back resistance of the diode D by connecting a resistor (not shown) in parallel with the later having a resistance of the order of magnitude of the resistance of the plate resistor $R_{a1}$.

Figure 4:
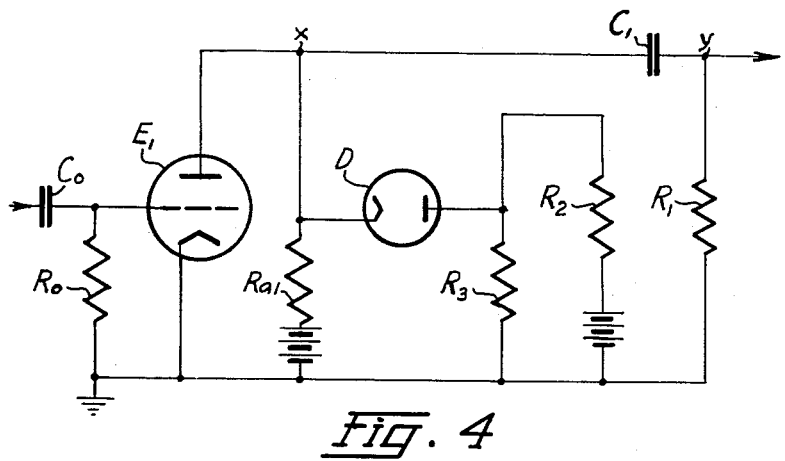
Fig. 4 is a wiring diagram of a further embodiment of the present invention.
Figure 4A:
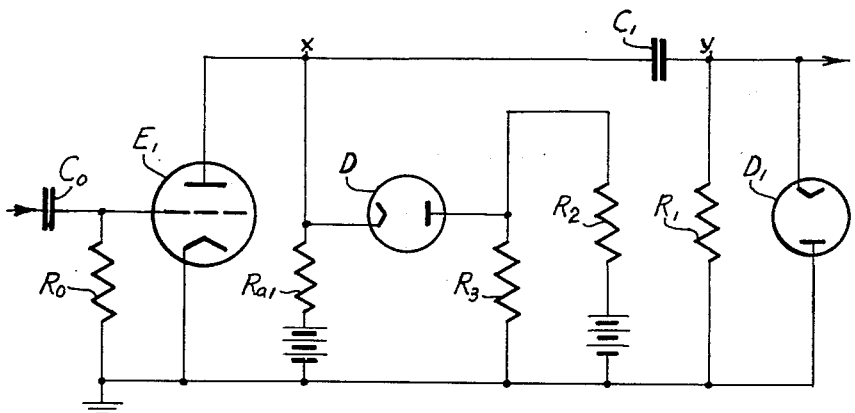
Fig. 4a is a wiring diagram showing a modification of the Fig. 4 embodiment of the invention.

Further, if desired, the blocking condenser $C_2$ of the arrangement in Fig. 3 may be omitted so that the very small secondary overswing generated at the input $x$ is thereby eliminated. This modified circuit is illustrated in Fig. 4 which omits that portion of the amplifier preceding the stage $E_1$ merely for the sake of simplicity. In the modified arrangement of Fig. 4, the diode D is connected to the input $x$ of the coupling $R_1C_1$ and at a point of similar potential on a voltage divider consisting of resistors $R_2$ and $R_3$, so that the diode D will not carry any null current. In the Fig. 4a modification, as in Fig. 3a, a diode $D_1$ is connected in parallel with the resistor $R_1$ for the purpose of eliminating any remaining primary overswing at the output point $y$.

Referring to Fig. 1c, the effect of connecting a diode to the input of the second coupling in accordance with the present invention, for example, as in Figs. 3 and 4, is there illustrated by the broken line Z which shows that only a remnant remains from the overswing P which is smaller than the latter by a plurality of orders of magnitude. The remnant Z remaining of the overswing P results from the non-linear characteristics of the diode connected to the input of the second coupling.

When the diode is connected to the input of the third coupling, rather than the input of the second coupling, as in Figs. 3 and 4, the amplitude of the overswing is already of a higher order of magnitude than at the input of the second coupling, so that the diode connected to the input of the third coupling is less effective, and the primary overswing $P_1$ is partially suppressed, as indicated by the broken line $Z_1$, but a secondary overswing $P_2$ is generated. However, in accordance with the present invention, the time constants of the couplings for the first and second stages of the amplifier are selected so that the amplitude of the secondary overswing $P_2$ is as small as possible while its duration is greater than that of the signal V itself. On the other hand, the elements of the third coupling are selected so that the latter has a time constant that is smaller than the time constant of the second coupling by at least one order of magnitude, so that the diode added in accordance with this invention eliminates the remaining overswing and the secondary overswing $P_2$, which is smaller by a plurality of orders of magnitude than the signal V, is suppressed.

It will be obvious that the present invention may be applied to the coupling circuit of the second or third amplifier stage, as described above, and also to all subsequent stages of the amplifier. In the latter case, it is necessary to consider the time constants of all preceding amplifier stages so that the time constant of the coupling, to the input of which the diode is connected, is smaller than the time constant of any preceding coupling by at least one order of magnitude.

It can be proven theoretically that an overswing caused by a coupling between stages of an amplifier can be reduced in intensity by the coupling of a subsequent stage of amplification, if the latter has a time constant which is smaller than that of the coupling producing the overswing by at least one order of magnitude. The suppression of the overswing will be proportionate to the ratio of the time constants.

The small time constant of a coupling to the input of which a diode D is connected in parallel, in accordance with the present invention, causes the generation of an overswing of relatively great amplitude but of very short duration. However, this overswing is a primary overswing which can be limited by a diode without the danger of generating a secondary overswing, as is the case when the diode $D_1$ is substituted for the usual resistor of the resistance-capacitance coupling, as in Fig. 2 illustrating a prior art arrangement.

If a primary overswing of short duration is generated in the terminal or last stage of the amplifier, for example, if the diode is connected to the input of the last coupling, as in accordance with the present invention, the primary overswing of short duration can be utilized, for example, through oscillograph analysis, to facilitate the determination of the transmitted signal, and therefore does not constitute a disadvantage.

From the above, it will be apparent that a coupling provided with a diode D in accordance with the present invention does not generate any new secondary overswing, while secondary overswings generated in preceding couplings are suppressed.

Although four specific embodiments of the invention have been described in detail herein with reference to Figs. 3, 3a, 4 and 4a which illustrate amplifiers of wide dynamic range, such specific embodiments are intended to serve only to illustrate the subject matter of the invention which consists in the connection of a diode to the input of the coupling of a second or later stage having a time constant smaller than that of the preceding coupling or couplings by at least one order of magnitude, and various changes and modifications may be effected in the illustrated embodiments without departing from the scope or spirit of the invention, except as defined in the appended claims.

What is claimed is:

1. In a multistage amplifier, the combination of a plurality of stages of amplification arranged in sequence and each followed by a related resistance-capacitance coupling, and a diode connected to the input of the coupling following one of said stages after the first stage of amplification in order to short, and thereby suppress, primary overswings generated in the coupling of an earlier stage, said coupling following said one stage having a time constant which is smaller than the time constant of the coupling following the preceding stage by at least one order of magnitude.

2. In a multistage amplifier, the combination as in claim 1, further comprising an additional diode connected in parallel with the resistance of said coupling following said one stage of amplification, thereby to eliminate any remaining primary overswing occurring at the output of said coupling following said one stage.

3. In a multistage amplifier, the combination as in claim 2, further comprising a blocking condenser connecting the first mentioned diode to said input of the coupling following said one stage.

4. In a multistage amplifier, the combination as in claim 2, wherein at least said one stage of amplification includes a tube having an anode, cathode and grid, and further comprising a voltage divider, the first mentioned diode being connected between the anode of the tube of said one stage and said voltage divider, said voltage divider being proportioned to avoid the occurrence of a potential difference at said first diode, thereby to prevent the latter from carrying any null current.

5. In a multistage amplifier, the combination as in claim 1, further comprising a blocking condenser connecting said diode to said input of the coupling following said one stage.

6. In a multistage amplifier, the combination as in claim 1, wherein at least said one stage of amplification includes a tube having an anode, cathode and grid, and further comprising a voltage divider, said diode being connected between said anode of the tube of said one stage and said voltage divider, said voltage divider being proportioned to avoid the occurrence of a potential difference at said diode and, hence, to avoid the carrying of any null current by said diode.

7. In a multistage electronic pulse amplifier having a first limiting and rectifying stage and at least one following amplification stage, and a resistance-capacitance coupling following each of said stages; a diode connected to the input of the coupling following one of said stages of amplification in order to short, and thereby suppress, primary overswings generated in the coupling following a preceding stage, said coupling following said one stage having a time constant smaller than the time constant of the coupling following said preceding stage by at least one order of magnitude.

References Cited in the file of this patent
UNITED STATES PATENTS

| | | |
|---|---|---|
| 2,515,763 | Downie | July 18, 1950 |
| 2,731,557 | Clayden | July 17, 1956 |
| 2,789,162 | Ziffer | Apr. 16, 1957 |

FOREIGN PATENTS

| | | |
|---|---|---|
| 143,356 | Australia | Sept. 12, 1951 |